Dec. 13, 1960   F. W. LEE   2,964,700
MAGNETIC VARIOMETER
Filed July 22, 1953   2 Sheets-Sheet 2

INVENTOR
FREDERICK W. LEE
BY
H. L. Godfrey
ATTORNEY

United States Patent Office 2,964,700
Patented Dec. 13, 1960

2,964,700

MAGNETIC VARIOMETER

Frederick W. Lee, Owings Mills, Md.

Filed July 22, 1953, Ser. No. 369,744

3 Claims. (Cl. 324—43)

(Granted under Title 35, U.S. Code (1952), sec. 266)

The invention described herein may be manufactured and used by or for the Government of the United States for governmental purposes without the payment to me of any royalty thereon in accordance with the provisions of the Act of April 30, 1928 (Ch. 460, 45 Stat. L. 467).

This invention relates to a magnetic variometer and more particularly to a device for continuously measuring variations of a magnetic field.

In making a magnetic survey by measuring the magnetic field at a number of separated stations, an erroneous representation of the field may be drawn, since the field may have between stations a sharp deviation from the apparent trend. Moreover, a survey is slow and costly if made at a plurality of stations by a device which must be set up, balanced and adjusted to obtain a reading. A device capable of giving a continuous indication of changes in the magnetic field would eliminate possibility of missing sharp deviations and would permit accurate magnetic surveys to be made rapidly. A device for giving a continuous indication of the magnetic field must operate automatically without necessity for its being adjusted or balanced to obtain a reading for each change in the magnetic field. With such a device magnetic surveys could be made from an aircraft in flight.

It is an object of this invention to provide a device for giving continuous indication of changes in a magnetic field.

It is also an object of this invention to provide a device for giving indications of changes in magnetic field intensity, said device operating to give an indication without being adjusted and balanced to indicate each change.

It is also an object of this invention to provide a magnetic variometer for recording changes in a magnetic field, the recording indicating corresponding magnetic field characteristics and the location thereof.

It is a further object of this invention to provide a magnetic variometer adapted for use in an aircraft.

These and other objects will appear from the following specification taken in connection with the accompanying drawing, in which.

Figure 1:
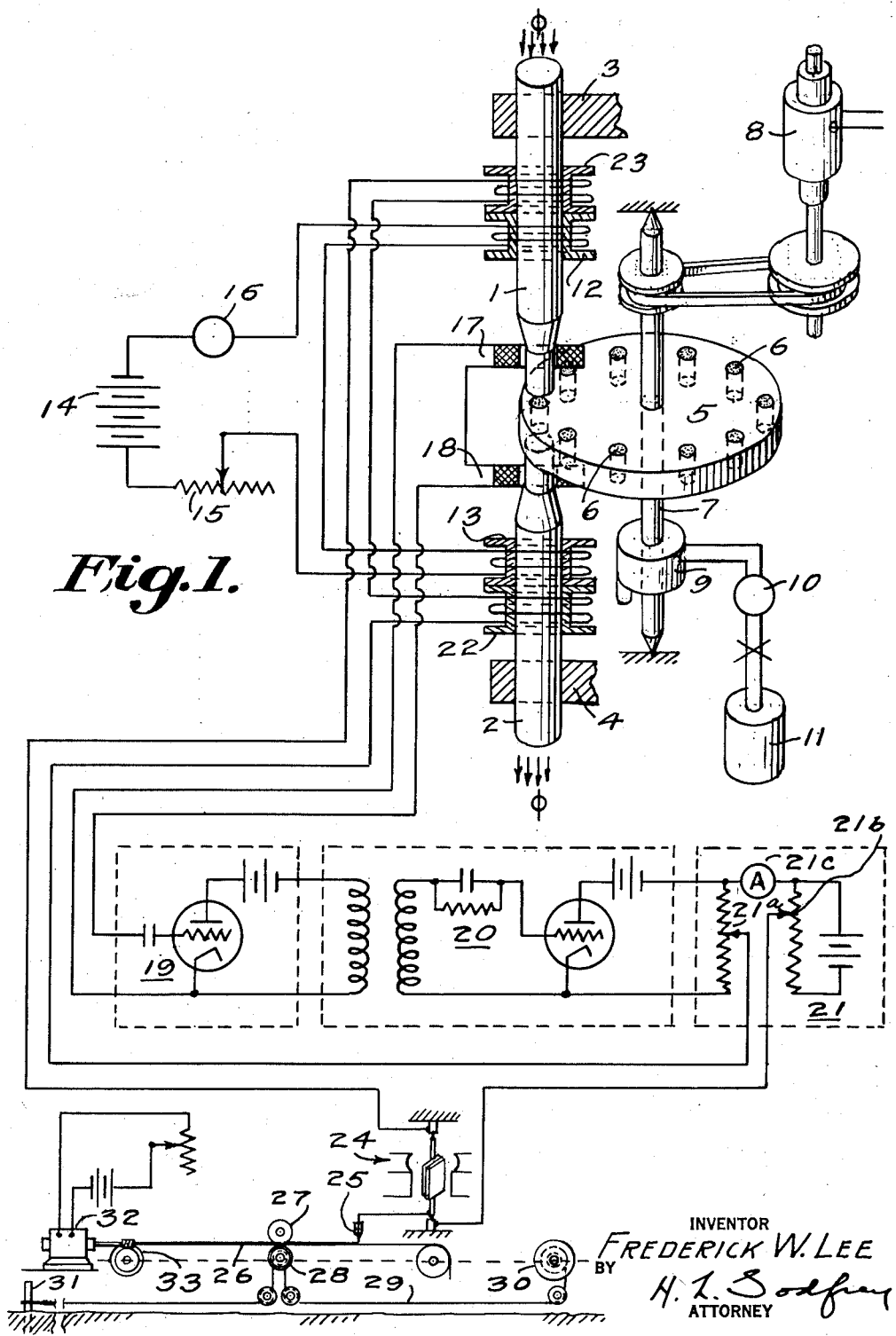
Fig. 1 is a schematic diagram of a device involving the principles of this invention.

As shown in Fig. 1, the magnetic variometer is provided with rods 1 and 2 axially aligned and with their adjacent ends slightly separated. Rods 1 and 2 are each reduced in diameter for a short distance at their adjacent ends. Rods 1 and 2 are of a magnetic substance which is highly permeable to magnetic flux, preferably Perminvar or Hypernik, and are supported in axial alignment by supports 3 and 4, respectively.

A rotating disk 5 of non-magnetic material, preferably fiber or plastic, is mounted for rotation between the adjacent ends of rods 1 and 2 on a shaft 7 the axis of which is parallel to the axis of rods 1 and 2. Disk 5 has inserted therein a plurality of inserts 6 passing completely through said disk and mounted in a circle concentric with the axis thereof. Inserts 6 are made of a highly permeable substance and may be made of the same material as the rods 1 and 2. As the disk 5 rotates each insert 6, as it passes between the adjacent ends of rods 1 and 2, substantially closes the gap therebetween. Disk 5 is rotated by a small gas turbine 9 which receives gas under pressure from tank 11 through pressure regulator 10. Alternatively, disk 5 may be rotated by an electric motor 8 connected to the shaft 7 by a belt.

Rods 1 and 2 are surrounded by counter-balancing coils 12 and 13, respectively, which are connected in series with each other and with an adjustable resistor 15, battery 14, and ammeter 16.

A pair of sensing coils 17 and 18 are provided surrounding rods 1 and 2, respectively, near the adjacent ends thereof. Coils 17 and 18 are connected in series with each other and to the input of amplifier 19. The output of amplifier 19 is connected to rectifier 20. The output of rectifier 20 appears as a changing voltage across resistor 21a of output circuit 21, said voltage varying in proportion to the peak value of the changing flux passing through sensing coils 17 and 18. An adjustable tap engaging resistor 21a is connected through flux control coils 22 and 23 and back through galvanometer 24, potentiometer 21b and ammeter 21c to the junction of resistor 21a and the plate battery of rectifier stage 20. Flux control coils 22 and 23 surround rods 2 and 1, respectively. Coils 22 and 23 are so connected that the flux produced thereby is cumulative.

Galvanometer 24 carries a stylus 25 mounted to mark a movable recording strip 26. Recording strip 26 is squeezed between rollers 27 and 28. A flexible cable 29 may pass from spool 30 over a pulley fixed to roller 28 and thence to a peg 31 which may be anchored in the ground. The strip 26 forced between driving rollers 27 and 28 is wound on take-up drum 33 driven through a friction clutch by motor 32. The torque exerted on take-up drum 33 by motor 32 is such that strip 26 will be wound on drum 33 only after being moved by rollers 27 and 28.

In the operation of the device of the magnetic variometer shown in Fig. 1, the disk 5 is rapidly rotated by turbine 9 which is driven by gas expanding from tank 11 and regulated by regulator 10. Alternatively disk 5 may be rotated by motor 8. The component of the earth's magnetic field which is parallel to rods 1 and 2 will induce therein a flux indicative of that component. First, resistor 15 is adjusted so that battery 14 causes a current to flow through coils 12 and 13 sufficient to balance out nearly all of the flux induced in rods 1 and 2.

As the disk 5 rotates and the inserts 6 alternately are placed in the gap between rods 1 and 2 and removed therefrom, the flux in rods 1 and 2 will be alternately increased and diminished within the sub-saturation range as the air gap is opened and closed. This changing flux induces in sensing coils 17 and 18 an alternating current which is applied to amplifier 19. Amplifier 19 amplifies this changing current and passes it on to rectifier 20 where it is converted into a direct current.

The current produced in the output circuit 21 and fed to flux control coils 22 and 23 is opposite to the changing flux produced by the earth's field sensed by coils 17 and 18 and tends to keep the flux through rods 1 and 2 at a constant value. The current through ammeter 21c, galvanometer 24, and flux control coils 22 and 23, is therefore an indication of variations in the intensity of the earth's magnetic field. Tap 21a in output circuit 21 may be adjusted to determine the range through which the current indicating the earth's field will swing. Potentiometer 21b is used to adjust the zero value. Meter 21c is a monitoring ammeter to permit proper adjustment of the output current.

In one use of this instrument, the peg 31 is driven in the ground. As the instrument is carried along a course, cable 29 is pulled from roller 30, rotating drum 28 and causing recording strip 26 to be moved under stylus 25. Therefore, the recordings on strip 26 will be in accurate relationship with respect to distance to the course passed over. Drum 33 will automatically take up the amount of recording strip that is pulled through drums 27 and 28.

Figure 2:
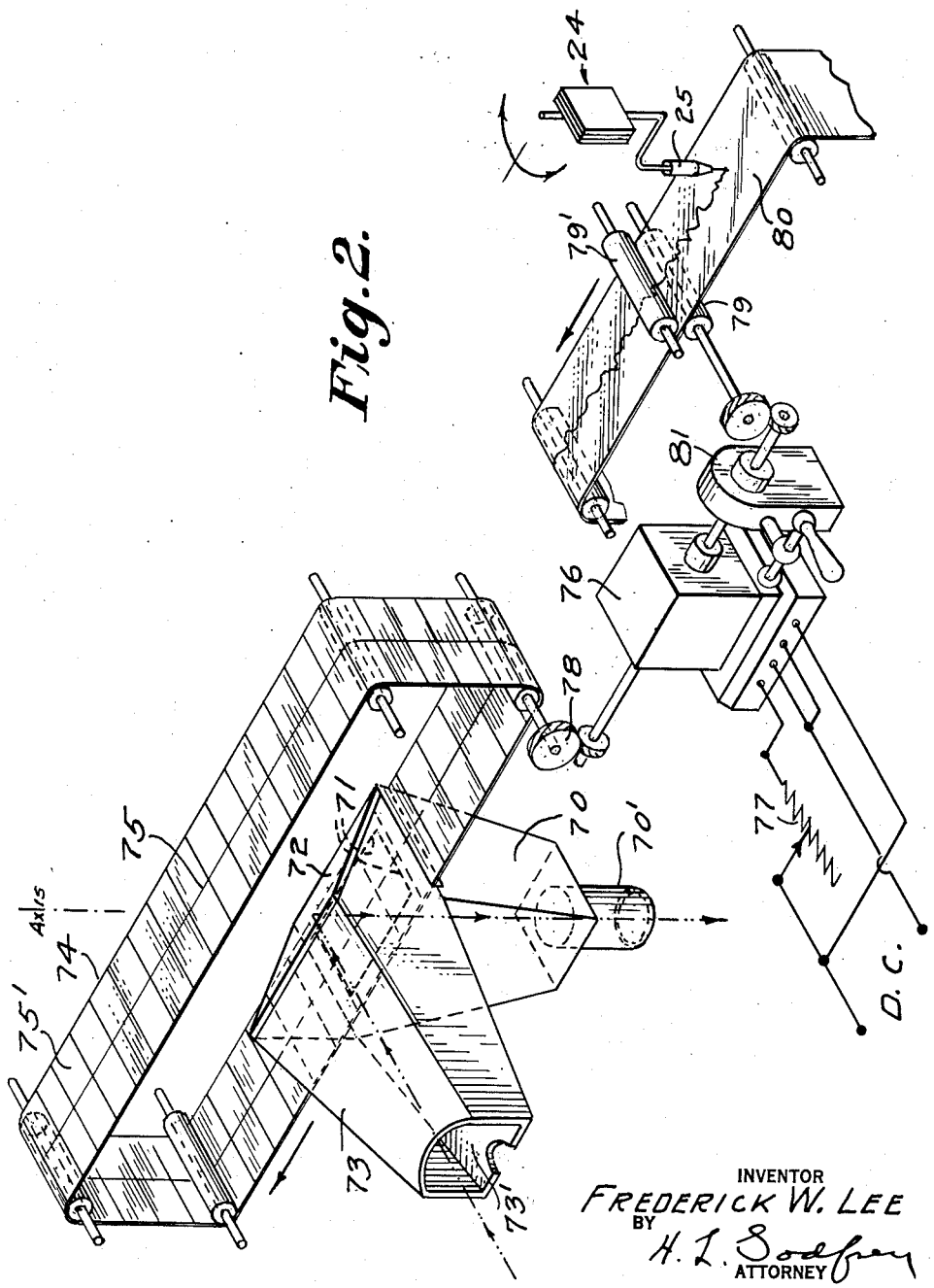
Fig. 2 is a perspective view of the recording feature of this invention adapted for use in an aircraft.

In Fig. 2 is shown a recording apparatus adapted to be used with the above-described magnetic variometer on an aircraft in flight. A camera 70 includes a lens element 70' arranged to project an image of the earth below on translucent plate 71, which may be of ground glass. Flexible transparent strip 74, which may be cellophane, is continuous and travels over four guiding rollers. Camera 70, strip 74, and the guiding rollers are integrally mounted and rotate together about a vertical axis. Strip 74 carries longitudinal marking indicia, such as a straight line 75, and also carries transverse marking indicia such as straight lines 75'. A viewing hood 73 with a viewing opening 73' terminates at mirror 72, inclined at an angle to translucent plate 71.

Strip 74 is driven through one of the guiding rollers and gears 78 by motor 76, the speed of which may be regulated by resistor 77. Motor 76 also, through variable speed transmission 81, drives roller 79, which in conjunction with roller 79' moves recording strip 80. Stylus 25 of galvanometer 24 corresponds to the stylus and galvanometer referenced by the same numbers in Fig. 1.

In the use of the modification shown in Fig. 2, the aircraft flies over the territory where the earth's magnetic variation is to be investigated. The aircraft normally flies along a straight course and at a substantially constant height above the earth's surface. Lens 70' is adjusted to throw an image of the earth's surface on ground glass plate 71. This is done by viewing ground glass plate 71 through viewing opening 73' and inclined mirror 72.

Camera 70 is now rotated about a vertical axis so that the image of the earth's surface on plate 71 moves therealong in a direction parallel to the longitudinal line 75. This adjustment is made by rotating camera 70 until a feature of the earth's surface, such as a tree, moves along plate 71 in a direction substantially parallel to mark 75. The speed of motor 76 is then adjusted, by means of resistor 77, so that the transverse line 75' moves along plate 71 at the same speed with which the image of the earth's surface moves therealong. This may be done by adjusting resistor 77 until a mark 75' is kept in registry with the image of a tree or other features of the earth's surface as it moves along plate 71.

Variable speed transmission 81 is now adjusted to give the desired speed of movement to recording strip 80. This speed may be arbitrarily chosen if the flight is maintained at a contsant level. However, if the flight along one course changes in height above the earth's surface, variable speed transmission 81 must be altered if the recording on strip 80 is to have a uniform scale. The speed of strip 80 should be inversely proportional to the height at which the plane is flying above the earth's surface. This height may be ascertained from corrected barometric readings or from a radio-type altimeter.

The above described magnetic variometer is simple in construction and will allow changes in the earth's field to be rapidly and continuously recorded over a long distance. The apparatus described above is by way of example only. Many modifications will occur to those skilled in the art within the scope of the invention as defined by the appended claims.

The terms "instantaneous" and "instantaneously" are used in the appended claims in their usual sense, as denoting something done in an instant or without any perceptible or substantial time delay. (Webster's New International Dictionary, G. & C. Merriam Co., 1920, page 1118.)

What is claimed is:

1. In combination, two axially aligned separated permeable members, a rotatable non-magnetic member carrying at least one permeable insert which is alternately inserted between said two permeable members and removed therefrom by rotation of said rotatable member, means for rotating said rotatable member, a sensing coil around each of said permeable members, said coils connected in series with each other, and with the input of a control circuit, a counter-balancing coil around each of said permeable members connected to the output of said control circuit, whereby a magnetic flux induced in said permeable members by the earth's magnetic field causes said control circuit to deliver a current to flow in said counter-balancing coils to counter-balance said induced flux.

2. The combination of claim 1, in which the rotatable member carries a plurality of permeable inserts which are successively inserted between said permeable members and removed therefrom by rotation of said rotatable member.

3. A magnetic variometer comprising, in combination, (a) permeable means adapted to have induced therein by the earth's magnetic field a first flux component proportioned to said field; (b) said permeable means comprising a magnetic core having a magnetic gap therein, with a core portion mechanically movable in said gap and means for cyclically moving said portion therein for cyclically varying the magnetic permeability of said permeable means for modulating the flux therein; (c) flux balancing means juxtaposed to said permeable means and current energizable to induce in such permeable means a second flux component opposing said first flux component; (d) means coupled to said flux balancing means for supplying an adjustable current thereto of a value for producing in said permeable means a modulated resultant flux having a maximum value less than the value of flux required to magnetically saturate said permeable means; (e) electronic means magnetically coupled to said permeable means for deriving from said modulated resultant flux a voltage proportional thereto; (f) means connecting said electronic means to said current supplying means for applying said voltage to adjust the current supplied thereby to said flux balancing means in such sense as to counteract change in the value of said modulated resultant flux, and (g) means connected to said current supplying means for measuring the increase and decrease in the so adjusted current as a measure of increase and decrease of the value of the earth's magnetic field.

References Cited in the file of this patent

UNITED STATES PATENTS

| | | |
|---|---|---|
| 1,264,495 | Dunbar | Apr. 30, 1918 |
| 1,379,916 | Guegnon | May 31, 1921 |
| 1,449,387 | Fairchild | Mar. 27, 1923 |
| 1,886,336 | Gunn | Nov. 1, 1932 |
| 2,072,950 | Huber | Mar. 9, 1937 |
| 2,334,469 | Alexandersson | Nov. 16, 1943 |
| 2,342,687 | Parrish | Feb. 29, 1944 |
| 2,406,870 | Vacquier | Sept. 3, 1946 |
| 2,440,503 | Fay | Apr. 27, 1948 |
| 2,447,849 | Fay | Aug. 24, 1948 |
| 2,467,211 | Hornfeck | Apr. 12, 1949 |
| 2,539,270 | Puranen et al. | Jan. 23, 1951 |
| 2,659,859 | Heiland | Nov. 17, 1953 |
| 2,727,206 | Ryerson | Dec. 13, 1955 |